United States Patent [19]

Ohyama

[11] Patent Number: 4,685,008
[45] Date of Patent: Aug. 4, 1987

[54] MAGNETIC RECORDING AND/OR REPRODUCING APPARATUS WITH TAPE LOADING AND REEL BRAKING MECHANISMS WHICH ARE CONTROLLED IN COMMON

[75] Inventor: Masao Ohyama, Tokyo, Japan

[73] Assignee: Sony Corporation, Tokyo, Japan

[21] Appl. No.: 746,083

[22] Filed: Jun. 18, 1985

[30] Foreign Application Priority Data

Jun. 20, 1984 [JP] Japan .............................. 59-126835

[51] Int. Cl.⁴ ..................... G11B 5/027; G11B 15/00
[52] U.S. Cl. ........................................ 360/85; 360/95
[58] Field of Search ............................. 360/85, 84, 95

[56] References Cited

U.S. PATENT DOCUMENTS

| | | | |
|---|---|---|---|
| 4,121,267 | 10/1978 | Hayashi | 360/85 |
| 4,126,888 | 11/1978 | Hayashi et al. | 360/85 |
| 4,138,699 | 2/1979 | Ura et al. | 360/85 |
| 4,459,625 | 7/1984 | Kawase | 360/95 X |
| 4,492,994 | 1/1985 | Suda et al. | 360/95 X |
| 4,562,496 | 12/1985 | Saito et al. | 360/85 |

Primary Examiner—John H. Wolff
Attorney, Agent, or Firm—Lewis H. Eslinger; Alvin Sinderbrand

[57] ABSTRACT

A magnetic recording and/or reproducing apparatus having a magnetic head assembly, a tape loading mechanism for loading and/or unloading a magnetic tape housed within a tape cassette onto or from the magnetic head assembly, a brake mechanism which can engage with or disengage a supply reel table and a take-up reel table, a common brakes slider for operating the brake mechanism, and a cam gear formed of first and second cam portions and which is driven by a single motor, wherein when the cam gear is rotated, operation of the tape loading mechanism is controlled by the first cam portion and operation the common brake slider is controlled by the second cam portion.

9 Claims, 16 Drawing Figures

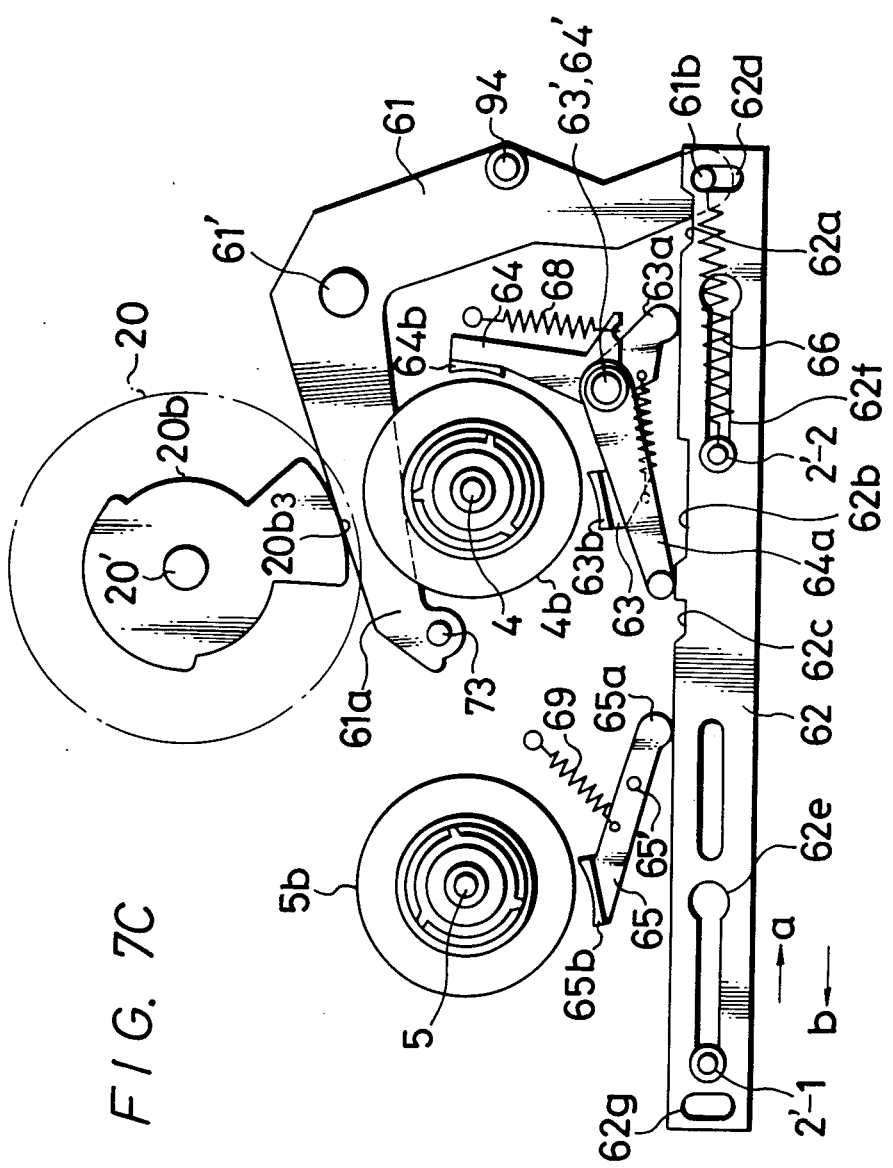

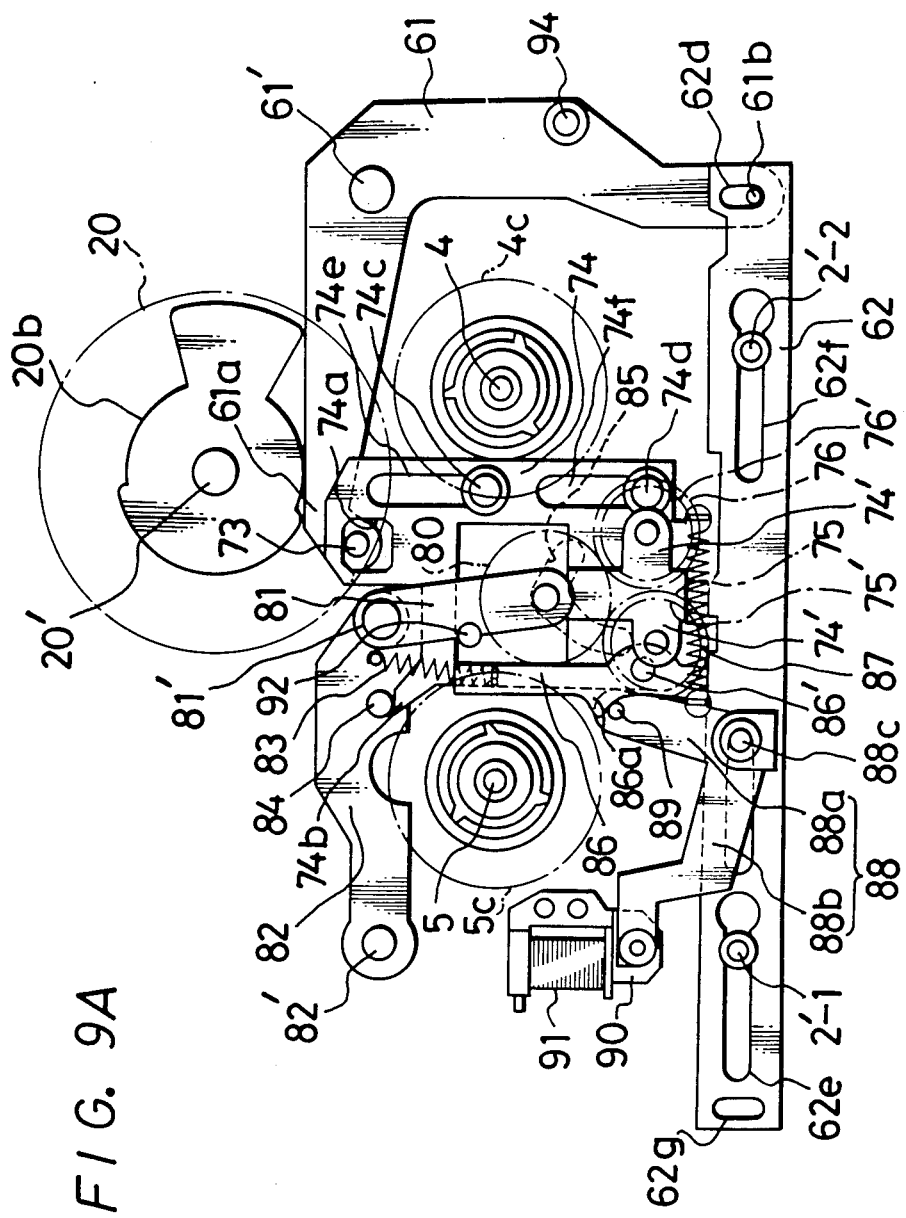

MAGNETIC RECORDING AND/OR REPRODUCING APPARATUS WITH TAPE LOADING AND REEL BRAKING MECHANISMS WHICH ARE CONTROLLED IN COMMON

BACKGROUND OF THE INVENTION

1. Field of the Invention

This invention relates to a magnetic recording and/or reproducing apparatus and more particularly to improvements in such apparatus having a tape loading mechanism, a reel table brake mechanism and fast forward/rewind mode switching means.

2. Description of the Prior Art

In a prior art magnetic recording and/or reproducing apparatus having a tape loading mechanism, a reel table brake mechanism and further a pinch roller pressing mechanism, one motor (loading motor) is used to drive the tape loading mechanism, and solenoids or plungers and so on are separately used to control the reel table brake mechanism and the pinch roller pressing mechanism, with the solenoids or plungers being controlled in accordance with the changeover of the operation modes of the magnetic recording and/or reproducing apparatus. Accordingly, it is difficult to establish the necessary timing of the operations of the brake and pinch roller and also an electric circuit for controlling them becomes complicated. Further, the number of solenoids or plungers is increased and so the manufacturing cost of the magnetic recording and/or reproducing apparatus is also increased.

A prior art magnetic recording and/or reproducing apparatus of this kind provided with a so-called M-type loading mechanism, is known to have two loading rings which are rotated around a rotary head drum in the positive and reverse directions and, these rings and the tape guide post member are coupled with one another by a spring. As the rings are rotated, the tape guide post member is moved along a guide groove of substantially inverted V-shape extending toward to the rotary head drum from the side thereof facing the reel tables. Alternatively, the loading mechanism may include a so-called loading arm system in which a pair of left and right loading arms are each formed by pivotally coupling first and second half portions thereof, the guideposts are attached to the first half portions of the arm and the second half portions of the arms are coupled to respective limiter gears, and in which the gears coupled with the both arms are directly engaged with each other and one of the limiter gears is rotated to thereby allow both arms to move the tape guide post members along the guide grooves similarly to the above.

However, the mechanism of the loading ring type has to provide two rings around the rotary head drum while the loading arm system has to include limiter gears which are large in diameter because both limiter gears to which the rear ends of both loading arms are coupled are directly coupled with each other. Accordingly, both types of loading mechanisms are limited in the positions where they may be situated and the loading mechanisms thereof require considerably large spaces, so the prior art loading ring type and loading arm type are disadvantageous for a magnetic recording and/or reproducing apparatus of small size.

Further, in the prior art magnetic recording and/or reproducing apparatus, since the brake mechanisms for the supply reel table and take-up reel table are operated simultaneously and they are controlled through the link mechanism, the arrangement thereof becomes complicated and large in size. Thus, the brake mechanism thereof requires a large space and prevents the overall arrangement from being made small in size. Moreover, since the brake mechanisms are arranged to engage or disengage both reel tables simultaneously both in the loading and normal speed transporting modes, both brake mechanisms disengage both reel tables and hence the reel tables are completely free to rotate. Thus, the tape is easily slackened during loading and the degree of tape contact with the head drum becomes weak so that there is the danger that the tracing by the magnetic head upon the tape will become unstable.

Furthermore, in the prior art, a known high speed drive mechanism for the reel tables of the magnetic recording and/or reproducing apparatus of this kind is of the so-called reel motor type in which a high speed transport gear is movable between the supply reel table and the take-up reel table and is driven in different rotation directions by a reel motor to thereby transport the tape in the fast forward mode and the rewind mode. Another known high speed drive mechanism is a so-called capstan positive and negative direction rotation type in which an idler is provided between a rotation member rotated by the drive force of the capstan and both reel tables, and rotation of the capstan in the positive direction and negative direction causes both reel tables to be rotated through the idler at high speed. Still another known high speed drive mechanism is of a so-called mechanical type in which a rotation member rotated by the drive force of the capstan is supported on a swingable link member and this rotation member transmits the rotation force directly to one reel table and through a rotary transfer member to the other reel table to thereby transport the reel tables in the fast forward mode or rewind mode, respectively.

However, the reel motor type requires the reel motor in addition to the capstan drive motor so that the manufacturing cost thereof is increased and is further disadvantageous from a power consumption standpoint.

Further, the known high speed drive mechanisms of the capstan positive and negative rotation type has a complicated electric circuit arrangement for rotating the capstan in the positive and negative directions and this increases the manufacturing cost. Furthermore, the high speed drive mechanisms of the mechanical type is disadvantageous in that the operation thereof will easily become unstable since the rotation member is swingably supported.

OBJECTS AND SUMMARY OF THE INVENTION

Accordingly, it is an object of this invention to provide a magnetic recording and/or reproducing apparatus having a tape loading mechanism and a brake mechanism for reel tables have their operations controlled by the same cam gear and a single motor whereby to simplify the arrangement, increase the freedom in designing and hence to miniaturize the apparatus.

It is another object of this invention to provide a magnetic recording and/or reproducing apparatus having a small-sized loading machanism which can be disposed at a desired position so that the freedom in designing can be increased, the arrangement can be simplified and the rotary portion of the loading mechanism can be provided within a small space.

It is still another object of this invention to provide a magnetic recording and/or reproducing apparatus of a small size in which separately operating brake members are provided for a supply reel table and a take-up reel table, an auxilliary brake member exerting a braking force weaker than the forces exerted by the first-mentioned brakes is provided for the supply reel table and the several brake members are operated by a common slider whereby the relative timing of the operation thereof can be adjusted easily and positively and the arrangement is such as to permit the same to be housed within a small spacing.

It is a further object of this invention to provide a magnetic recording and/or reproducing apparatus in which the drive force from a capstan motor rotating in one direction can be transmitted positively to a supply reel table and a take-up reel table to thereby carry out the fast forward mode and rewind mode so that an electric circuit for rotating a motor in the positive direction and negative direction is not required.

It is a still further object of this invention to provide a magnetic recording and/or reproducing apparatus in which change-over between the fast forward mode and rewind mode and switching and locking operation can be carried out by a single plunger or solenoid so that the operation thereof can be made stable and the construction thereof can be simplified and further in which no reel motor is used and the plunger requires only the fixing operation of a stopper member without kick or actuation operation so that the power consumption of the overall apparatus can be reduced and the manufacturing cost and the maintenance cost can both be reduced.

It is yet a further object of this invention to provide a magnetic recording and/or reproducing apparatus in which pressing of a pinch roller against the capstan is controlled by a common brake slider for controlling the brake mechanism for the reel tables, so that a separate solenoid or plunger for pressing the pinch roller is not necessary and such function can be controlled by a single motor for loading and braking, with the result that this apparatus is suitable for being small-sized and the manufacturing cost thereof is decreased.

According to an aspect of this invention, there is provided a magnetic recording and/or reproducing apparatus comprising:

(a) a magnetic head assembly having a magnetic head for recording a signal on a magnetic tape or reproducing it therefrom;

(b) tape guide means movable between an inoperative position within a tape cassette and an operation position for drawing out said magnetic tape from said tape cassette and for forming a predetermined tape path relative to said magnetic head assembly;

(c) loading means engaging with said tape guide means and for moving said tape guide means;

(d) a supply reel table for supporting and rotating a reel which supplies said magnetic tape;

(e) take-up reel table for supporting and rotating a reel which takes up said magnetic tape;

(f) brake means engageable with, and disengageable from said supply reel table and said take-up reel table, respectively;

(g) brake control means for controlling the operation of said brake means;

(h) a single motor; and (i) gear means having a first cam portion and a second cam portion and rotated by said motor, wherein, when said gear means is rotated by a drive force of said motor, said loading means are driven by said first cam portion to thereby move said tape guide means and said brake control means is driven by said second cam portion to thereby control said brake means to engage or disengage said reel tables, whereby to establish at least a stop mode, a tape loading mode, a tape unloading mode, a high speed fast forward/rewind mode and a normal tape speed forward mode.

These and other objects, features and advantages of the present invention will become apparent from the following detailed description of the preferred embodiment of the invention taken in conjunction with the accompanying drawings, throughout which like reference numerals designate like elements and parts.

BRIEF DESCRIPTION OF THE DRAWINGS

FIGS. 7A, 7B and 7C are respective plan views to which reference will be made in explaining the operation of a brake mechanism according to this invention;

FIGS. 9A, 9B and 9C are respective plan views to which reference will be made in explaining the operation of a mechanism for rotating the reel tables in accordance with this invention.

DESCRIPTION OF THE PREFERRED EMBODIMENT

Now, an embodiment of a magnetic recording and/or reproducing apparatus according to the present invention will hereinafter be described with reference to the drawings, in which the present invention is applied to a magnetic recording and/or reproducing apparatus having a rotary head.

Figure 1:
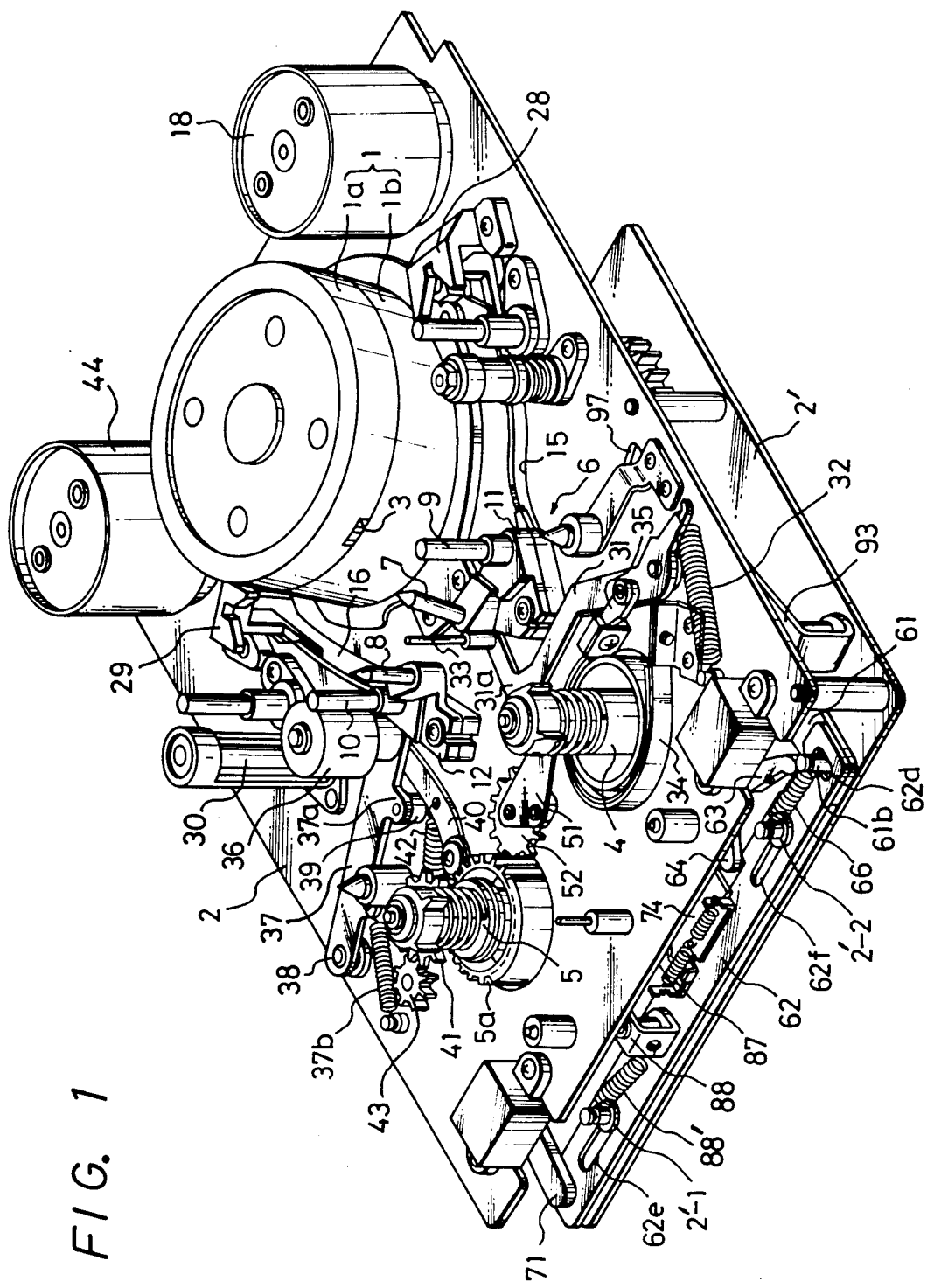
FIG. 1 is a perspective view of an example of a rotary head type magnetic recording and/or reproducing apparatus to which this invention is applied.

In such apparatus as shown in FIG. 1, there is provided a rotary head drum 1 which is formed of an upper drum 1a and a lower drum 1b. In this case, the lower drum 1b is fixed to a chassis or base plate 2 to be inclined with a predetermined angle thereto and the rotatable upper drum 1a has attached thereto a magnetic head 3. A loading mechanism 6 is provided between the rotary head drum 1, and a supply reel table 4 and take-up reel table 5.

Figure 2:
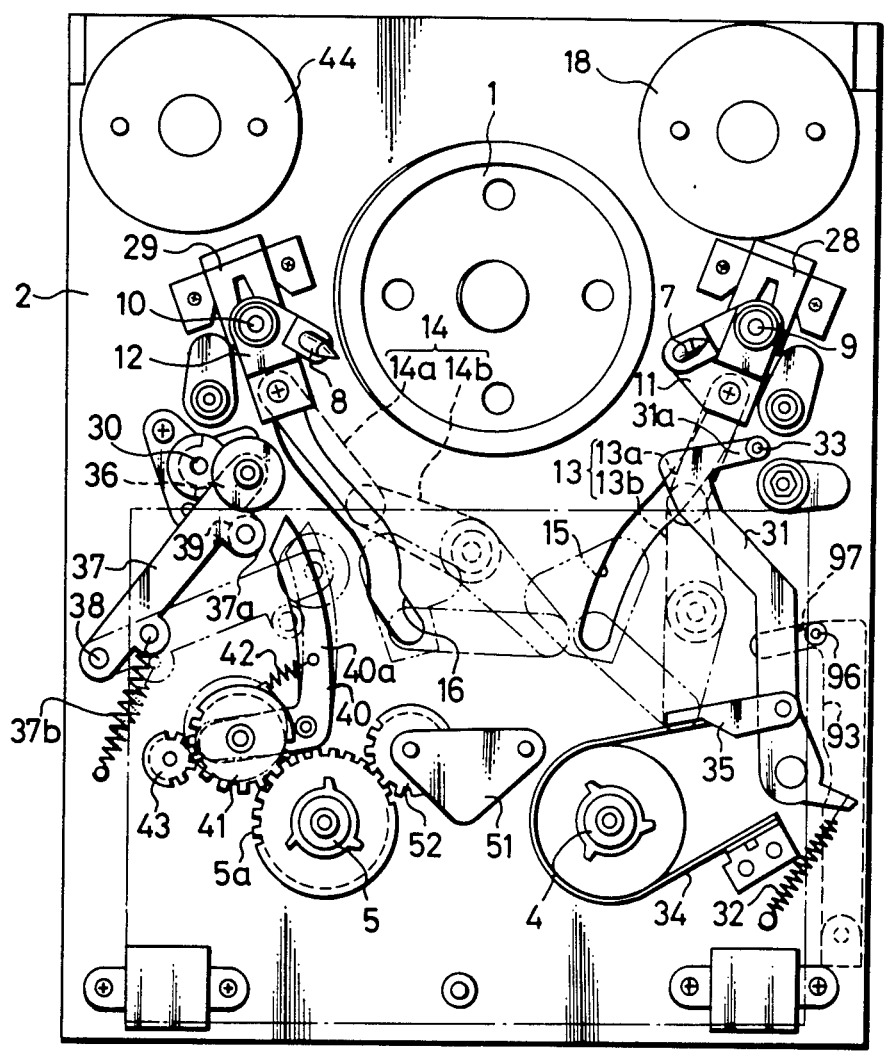
FIG. 2 is a top plan view of the apparatus of FIG. 1, illustrating its tape loading state.

This loading mechanism 6 is formed of tape guide post mounts 11 and 12 having mounted thereon inclined tape guide posts 7 and 8, each of which is inclined to be parallel to rotary head drum 1 at opposite sides of the latter when the loading is completed as will be described later. The loading mechanism further includes vertical tape guide posts 9 and 10 on mounts 11 and 12, respectively, and loading arms 13 and 14 which respectively move the tape guide post mounts 11 and 12. The loading arms 13 and 14 are formed of first loading arms 13a and 14a and second loading arms 13b and 14b that are linked rotatably, respectively (FIG. 2). The first loading arms 13a and 14a are pivotally connected, at their tip ends, to the tape guide post mounts 11 and 12, respectively, to be freely pivotable in the horizontal direction. The tape guide post mounts 11 and 12 are movably engaged with guide grooves 15 and 16 that are formed through the base plate 2 and diverge rearwardly from the reel tables 4 and 5 so as to extend at opposite sides of the rotary head drum 1.

The tape guide post mounts 11 and 12 are moved in the direction from adjacent the reel tables 4 and 5 toward the rotary head drum 1 when the loading arms 13 and 14 are moved by a drive mechanism so that a tape wound around the inclined tape guide posts 7, 8 and the vertical tape guide posts 9, 10 which are mounted on the tape guide post mounts 11 and 12 is loaded from the reels of a tape cassette (not shown) to the rotary head drum 1.

Figure 3:
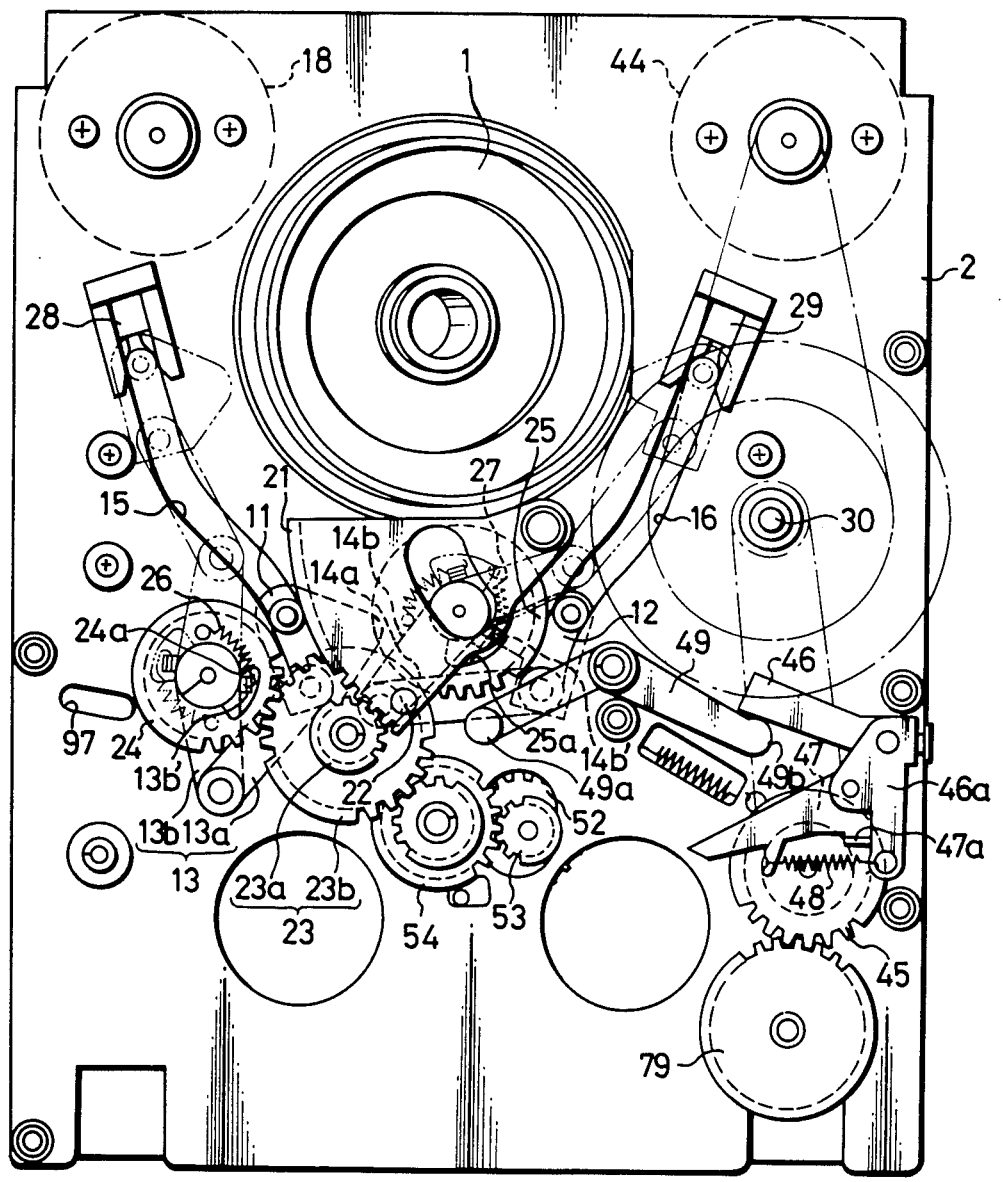
FIG. 3 is a bottom plan view of the apparatus of FIG. 1.
Figure 4:
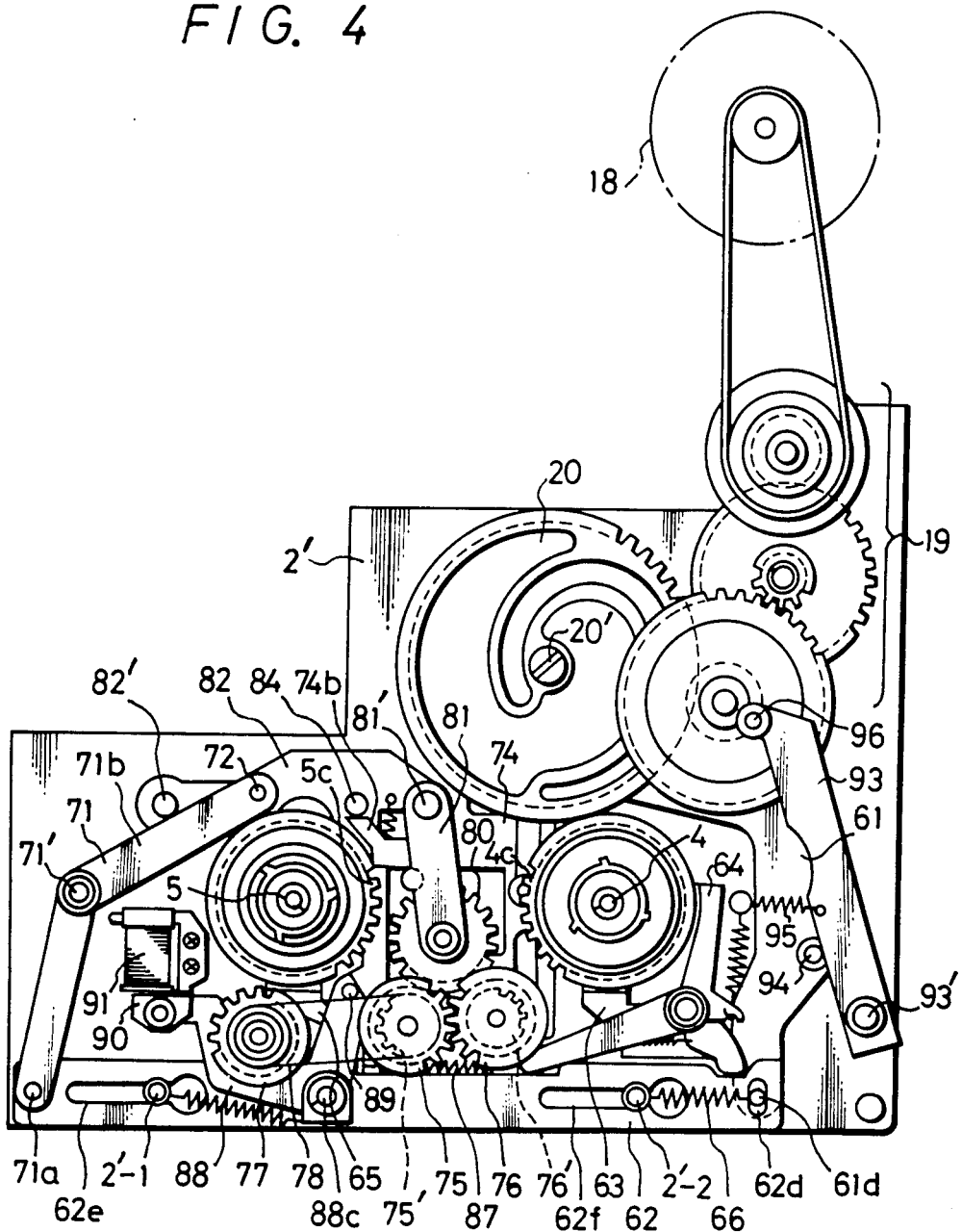
FIG. 4 is a top plan view of components assembled on a sub-base plate of the apparatus of FIG. 1.
Figure 5:
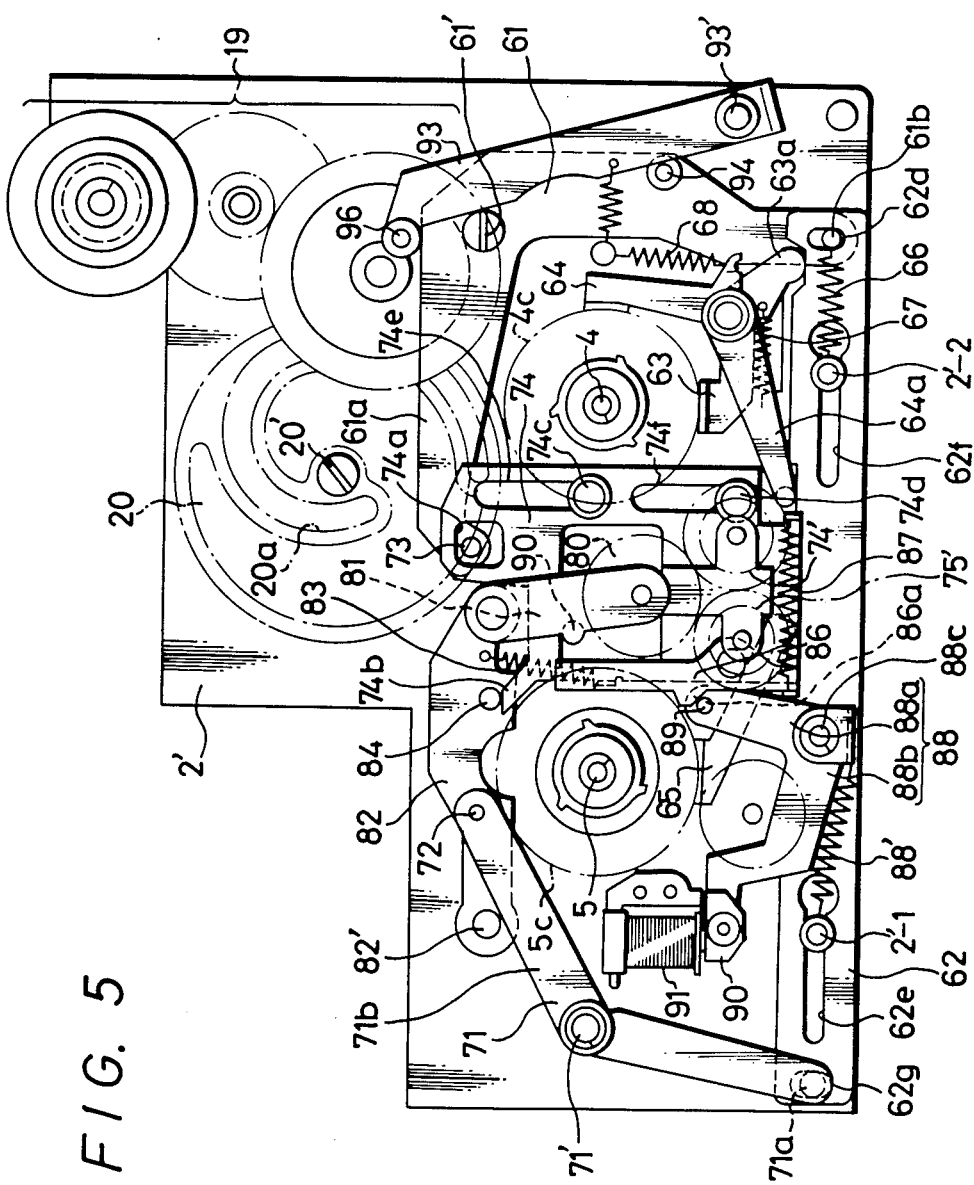
FIG. 5 is a view similar to that of FIG. 4 from which a gear member is removed.

The drive mechanism for the loading mechanism 6 is shown in FIG. 4 to include a loading motor 18 having its driving force transmitted through a reduction gear mechanism 19 to a cam gear 20 rotatable on a shaft 20' which is attached to a sub-chassis or sub-base plate 2'. As shown in FIG. 3, a pin 22 protrudes from the peripheral edge of a sector shape gear 21 pivotably supported on base plate 2 and such pin 22 is engaged with a spiral cam groove 20a that is formed on the upper surface of the cam gear 20 so that, when the cam gear 20 is rotated, the sector shape gear 21 is angularly displaced. The sector shape gear 21 is engaged with a small diameter tooth portion 23a of an intermediate gear 23, while a large diameter tooth portion 23b of the intermediate gear 23 is situated between, and engaged with two limiter gears 24 and 25.

Into elongated openings 24a and 25a formed through the limiter gears 24 and 25 in their peripheral directions, there are inserted protrusions 13b' and 14b' protruding from the second loading arms 13b and 14b which are pivoted to be coaxial with the limiter gears 24 and 25. The protrusions 13b' and 14b' and the limiter gears 24 and 25 are respectively coupled to one another through springs 26 and 27 extending generally in the rotation direction of the limiter gears thereof so that when the sector shape gear 21 is rotated, the above-mentioned second loading arms 13b and 14b are rotated together together with the limiter gears 24 and 25, respectively. As described above, when the second loading arms 13b and 14b are rotated, the tape guide post mounts 11 and 12 are pushed through the first loading arms 13a and 14a along the guide grooves 15 and 16 and thereby engaged with catchers 28 and 29 which are provided at the tip ends of the guide grooves 15 and 16.

In this state, the guide posts 7 and 9 and the guide posts 8 and 10 are respectively disposed at the opposite side portions of the rotary head drum 1, with the inclined guide posts 7 and 8 placed closest to the rotary head drum 1 and inclined in parallel thereto.

In the loading mechanism 6 constructed as mentioned above, in order for both tape guide post mounts 11 and 12 to move simultaneously and smoothly, the guide grooves 15 and 16 are formed asymmetrical with each other at their base end portions near the reel tables 4 and 5. In other words, as shown in FIGS. 1 and 3, the guide groove 15 has its base end portion near the supply reel table 4 formed with a smooth arcuate shape because the force is exerted in the backward direction on the tape guide post mount 11 by the loading arm 13. The other guide groove 16 has its base end portion near the take-up reel 5 formed with a special shape to enable the tape guide post mount 12 to move smoothly because the force initially applied to the tape guide post mount 12 by the loading arm 14 at substantially in the lateral direction.

Figure 6A:
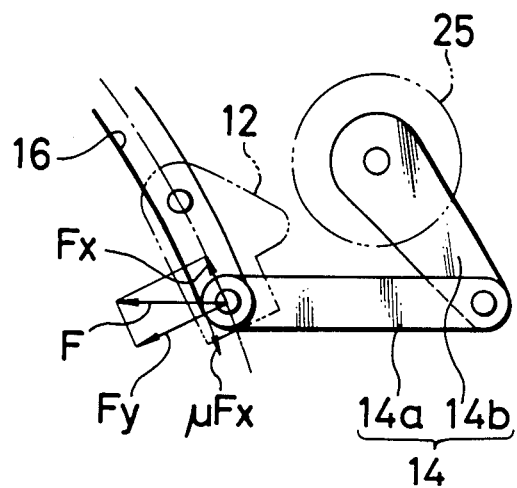
FIGS. 6A and 6B are detailed diagrammatic views to which reference will be made in explaining the configuration of a loading guide groove portion in the apparatus according to the invention.
Figure 6B:
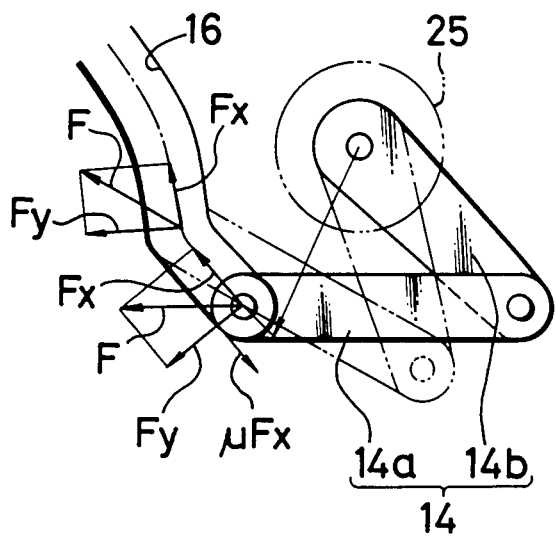

More particularly, if the guide groove 16 has its base end portion near the take-up reel 5 formed as a mere arc, as shown in FIG. 6A, a force F exerted on the tape guide post mount 12 by the loading arm 14 results in a relatively small force $F_x$ for moving the arm along groove 16 and a relatively large force $F_y$ exerted laterally in respect to the guide groove 16 so that the friction force $\mu$ $F_x$ becomes relatively large and hence the tape guide post mount 12 becomes unable to move. Therefore, if as shown in FIG. 6B, the guide groove 16 has its base end portion near the take-up reel 5 formed as a portion of an arc of which the center is identical with the rotation center of the second loading arm 14b, for the force F applied to the tape guide post mount 12, the force $F_x$ for moving the arm forward becomes relatively larger while the lateral force $F_y$ against the side of the guide groove 16 becomes smaller so that the frictional force $\mu$ $F_x$ is reduced to permit the tape guide post mount 12 to move smoothly. Thereafter, the tape guide post mount 12 is slidably moved similarly to the movement of mount 11 by loading arm 13 and hence both tape guide post mounts 11 and 12 can similarly be moved smoothly.

Referring again to FIGS. 1 and 2, on one side portion of the base plate 2, a tension arm 31 is pivotably supported so as to follow the movement of the tape guide post mount 11 through the spring force of a spring 32. This tension arm 31 has planted on its free end a pin 33 and has attached to its base through a link 35 one end of a tension belt 34, the other end of the tension belt 34 being fixed to the base plate 2 with the belt 34 being wound around the supply reel table 4. An angled end portion 31a of the tension arm 31 is disposed in front of the tape guide post mount 11 when the latter is moved to the tip end portion of the guide groove 15 so as to be engaged with the catcher 28.

At the other side portion of the base plate 2, or at the side of a capstan 30, a pinch roller arm 37 having a pinch roller 36 rotatably mounted at its tip end is pivotably supported by a shaft 38 and this pinch roller arm 37 is biased by a spring 37b. The pinch roller arm 37 carries adjacent the pinch roller 36 a roller 39 rotatable on a protrusion 37a and this roller 39 is in rolling contact with an inner edge of one side portion 40a of an arm 40 of substantially L-shape which is pivoted at its center on the base plate 2. The arm 40 rotatably supports at the end of its other side portion 40b a gear 41 which is engaged with a gear portion 5a formed around the peripheral edge of the take-up reel table 5. By a spring 42, the arm 40 is biased to rotate in the direction in which the gear 41 is engaged with the gear portion 5a of the take-up reel table 5 at all times. Further, when the pinch roller arm 37 is not operated, that is, before the pinch roller 36 is urged against the capstan 30, the roller 39 rotatably contacts with the inner edge of the one side portion 40a so that the arm 40 is rotated against the spring force of the spring 42 to make the gear 41 disengage the gear portion 5a of take-up reel table 5. When the pinch roller arm 37 is turned so as to urge the pinch roller 36 against the capstan 30, the roller 39 leaves the arm 40 so that the arm 40 can be turned by spring 42 to thereby engage the gear 41 with the gear portion 5a of the take-up reel table 5 and with a drive gear 43. This drive gear 43 is coaxially coupled with a pulley 45 (FIG. 3) to which the drive force is suitably transmitted from a drive motor 44. The moment the pinch roller 36 is urged against the capstan 30, the take-up reel table 5 is rotated by the drive motor 44 through the drive gear 43 and the gear 41 to take up the tape at a predetermined speed.

As shown in FIG. 3, the shaft 38 of the pinch roller arm 37 pivotably supports a rotary arm 46 at the opposite or under side of the base plate 2. This rotary arm 46 has a rotary member 46a extending at an angle therefrom. The rotary member 46a pivotally supports an engaging lever 47 to be pivoted relative to member 46a only in one direction. A spring 48 is tensioned between the engaging lever 47 and the rotary member 46a to bias the engaging lever 47 in such a direction that the rotation member 46a is engaged with an engaging member 47a of the lever 47 at all times. Between the rotary arm 46 and the sector shape gear 21, a lever 49 of substantially inverted V-shape is rotatably supported at its center on the base plate 2. When the sector shape gear 21 rotates so as to move the tape guide post mounts 11 and 12 in the directions toward catchers 28, 29 of the guide grooves 15, 16 or upon loading, an abutment 49a at one end of the lever 49 is pushed and hence the lever 49 is rotated. Thus, the other end 49b of this lever 49 pushes the rotary arm 46 so that the pinch roller arm 37 coaxial with the rotation arm 46 is rotated to approach the pinch roller 36 to the capstan 30, or moves it to the set-up state.

As shown in FIG. 2, at the upper surface of the base plate 2, a rotary arm 51 is supported to swing freely about a pivot 51a between the reel tables 4 and 5. The rotary arm 51 rotatably supports, at one end, a gear 52 which is engaged with the gear portion 5a of the take-up reel table 5. This gear 52 is integral with a gear 53 which is coaxial therewith at the lower surface side of the base plate 2 and a gear 54 (FIG. 3) is interposed between the gear 53 and the large diameter gear 23b of the intermediate gear 23, so that the rotation force of the intermediate gear 23 is transmitted to the gear 52. When the intermediate gear 23 rotates so as to move the tape guide post mounts 11 and 12 in the loading direction, the rotation force of the intermediate gear 23 is transmitted through the gear 54 to the gears 53 and 52. Since this rotation is in a direction to urge the gear 52 to engage with the gear portion 5a of the take-up reel table 5, the gear 52 is rotated around the pivot 51a of the rotary arm 51 and moved toward the take-up reel table 5 thereby engaged with the gear portion 5a of the take-up reel table 5 so that it rotates the take-up reel table 5 in the reverse direction relative to the direction for the normal speed forward and the fast forward modes to thereby draw out or unwind the tape upon loading. Thus, the tape can be protected from undesired tape tension.

The reel brake mechanism used in this invention will be described with reference mainly to FIGS. 7A-7C in which it is shown that a mode selecting lever 61 of L-shape is supported to be rotatable around a pivot 61' on a sub-base plate 2'. The outer edge of one end 61a of lever 61 contacts with the peripheral surface of the cam 20b formed on the lower surface of the cam gear 20 and a pin 61b planted at the other end of the mode lever 61 engages with an elongated opening 62d in one end portion of a brake slider 62 which is mounted on the sub-base plate 2' so as to be movable in the lateral direction, for example, by guide pins 2'-1, 2'-2 slidably received in elongated openings 62e, 62f. This brake slider 62 has formed, in its inner edge, operation recesses 62a, 62b and 62c for controlling brake levers 63, 64 and 65 which are respectively supported on the sub-base plate 2' to be freely turnable about shafts 63', 64' and 65'.

The brake lever 63 is the main brake for the supply reel table 4, the brake lever 64 is the soft brake for the supply reel table 4 and the brake lever 65 is the main brake for the take-up reel table 5, respectively. These brake levers 63, 64 and 65 are all engaged or made operative in the unloading and stop modes. In the loading mode, the main brake lever 65 for the take-up reel table 5 is disengaged or in its off-state and the main brake lever 63 and the soft brake lever 64 for the supply reel table 4 are both engaged or in their on-state. Finally, in the tape supplying mode, each brake lever is placed in its disengaged or off-state.

Figure 7A:
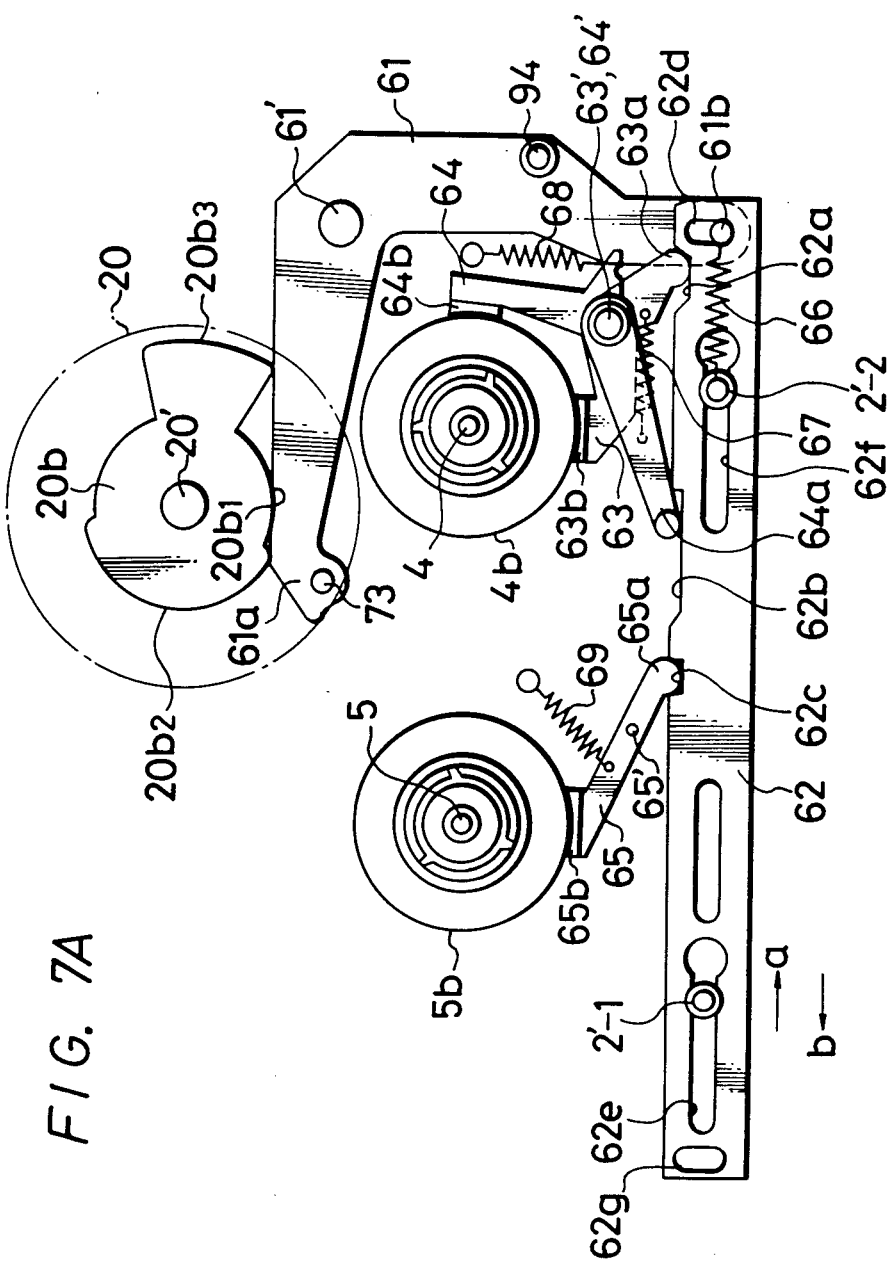

As shown in FIG. 7A, the mode selecting lever 61 can not rotate in the clockwise direction beyond the position in which its one end 61a contacts with a small diameter portion 20$b_1$ of the cam 20b of the cam gear 20. The brake slider 62 is biased in one direction (shown by an arrow b throughout FIGS. 7A to 7C) by a spring 66 and brake levers 63, 64 and 65 are respectively biased by springs 67, 68 and 69 such that the rear ends 63a, 64a and 65a are engaged with the operation recesses 62a, 62b and 62c, respectively. Thus brake shoes 63b, 64b on brake levers 63, 64 are urged against a drum portion 4b of the supply reel table 4 and a brake shoe 65b on brake lever 65 is urged against a drum portion 5b of the take-up reel table 5 so that the both reel tables 4 and 5 are both braked in the stop mode (FIG. 7A).

Figure 7B:
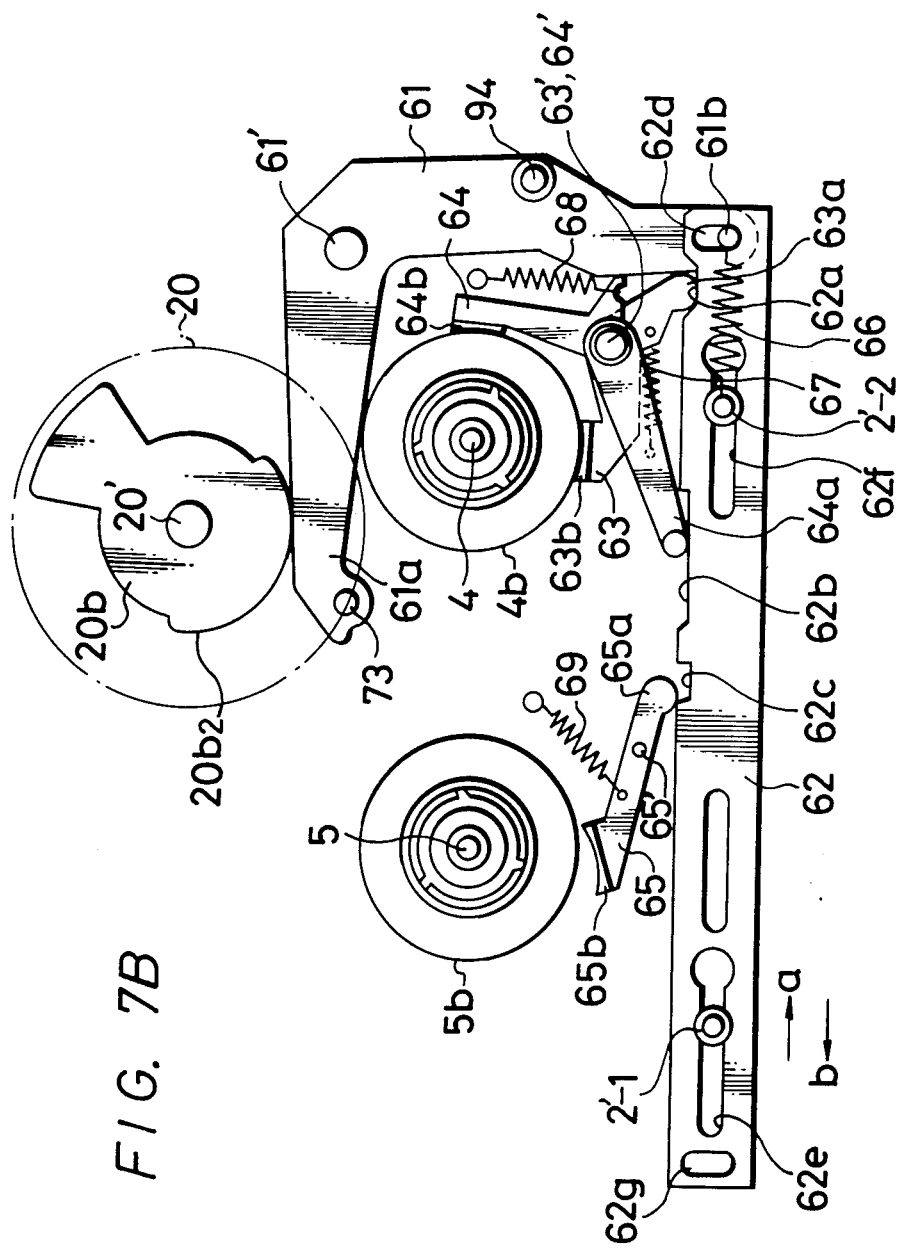

In the loading mode, when the cam gear 20 rotates so that an intermediate diameter portion 20$b_2$ of the cam 20b contacts with the one end 61a of the mode selecting lever 61, the mode lever 61 turns slightly and the brake slider 62 is slidably moved in the direction of arrow a in FIG. 7B against the force of spring 66. As a result, the operation recess 62c disengages from the rear end 65a of the brake lever 65 which is turned against the spring force of the spring 69 with its rear end 65a running on the upper portion so that brake shoe 65b disengages from the drum portion 5b of the take-up reel table 5. Thus only the take-up reel table 5 is released from its stop mode (FIG. 7B) and the tape loading becomes possible.

Thereafter, in the tape running mode, or high speed mode of FF/REW or normal speed mode of FWD, when the cam gear 20 rotates so that a large diameter portion 20$b_3$ of the cam 20b contacts with the one end 61a of the mode lever 61, the mode lever 61 rotates further and hence the brake slider 62 moves further in the direction shown by the arrow a so that the operation recesses 62a and 62b also disengage from the rear ends 63a and 64a of the brake lever 63 and the soft brake lever 64, or the rear ends 63a and 64a of the brake lever 63 and the soft brake lever 64 are lifted on the upper portion to be rotatable against the spring force of the springs 67 and 68. As a result, the brake shoes 63b and 64b disengage from the drum portion 4b of the supply reel table 4 so that the supply reel table 4 is also set free from its stopped state (FIG. 7C) and thus the tape is permitted to run.

In this case, since the operation recess 62a of the brake slider 62 corresponding to the main brake lever 63 is narrower in width than the operation recess 62b corresponding to the soft brake lever 64, the main brake lever 63 is set free from the stop mode before the soft brake lever 64 is. When changing over to the stop mode, on the contrary, the soft brake lever 64 is set in the stop mode before the main brake 63 is. Accordingly, the supply reel table 4 is prevented from being set in the stop mode rapidly so that no undesired tape tension acts on the tape. On the other hand, the brake 65 of the take-up reel table 5 is the last to be set in the stop mode.

A control mechanism for the pinch roller of this invention will next be described with reference to FIGS. 8A to 8C.

Figure 8A:
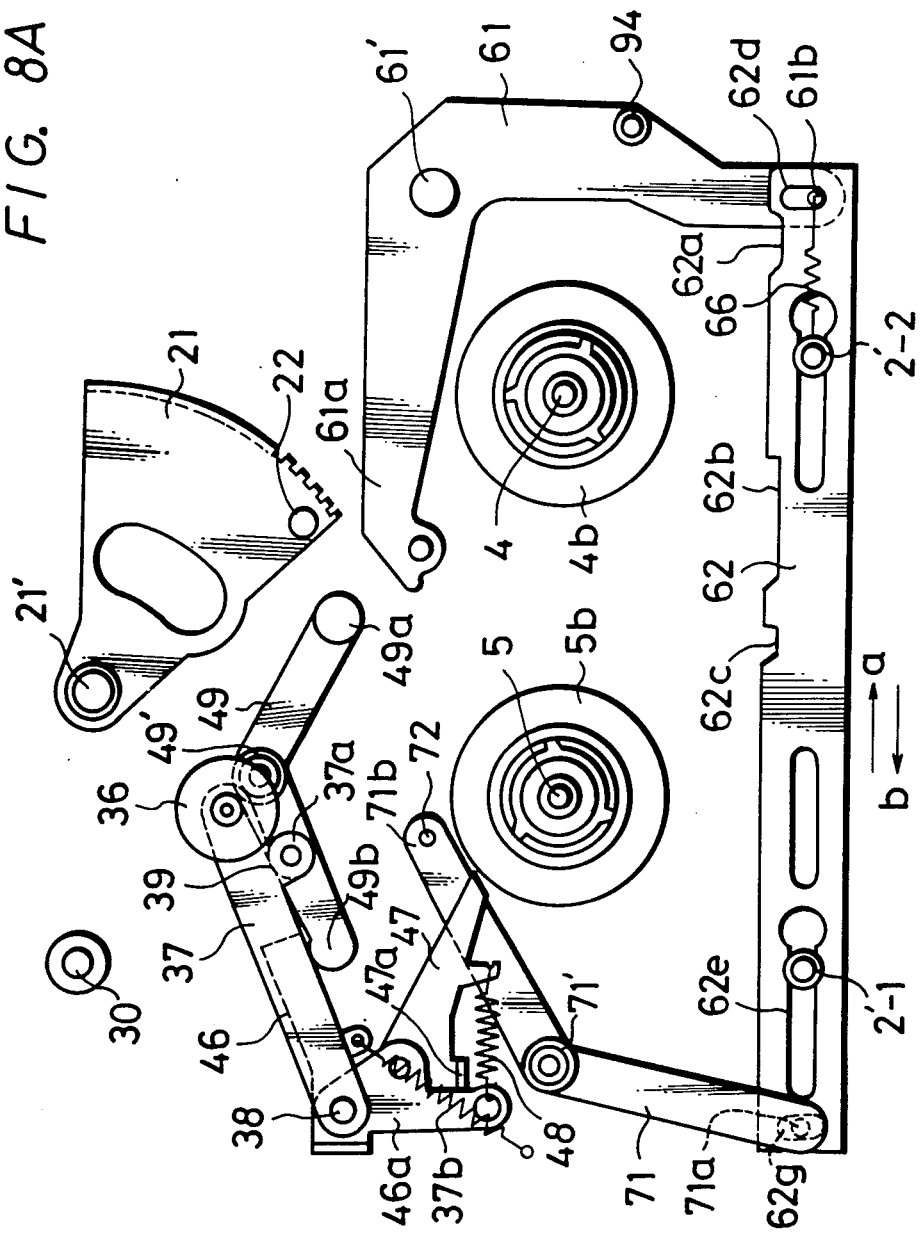
FIGS. 8A, 8B and 8C are respective plan views to which reference will be made in explaining the operation of a pinch roller mechanism according to this invention.
Figure 8B:
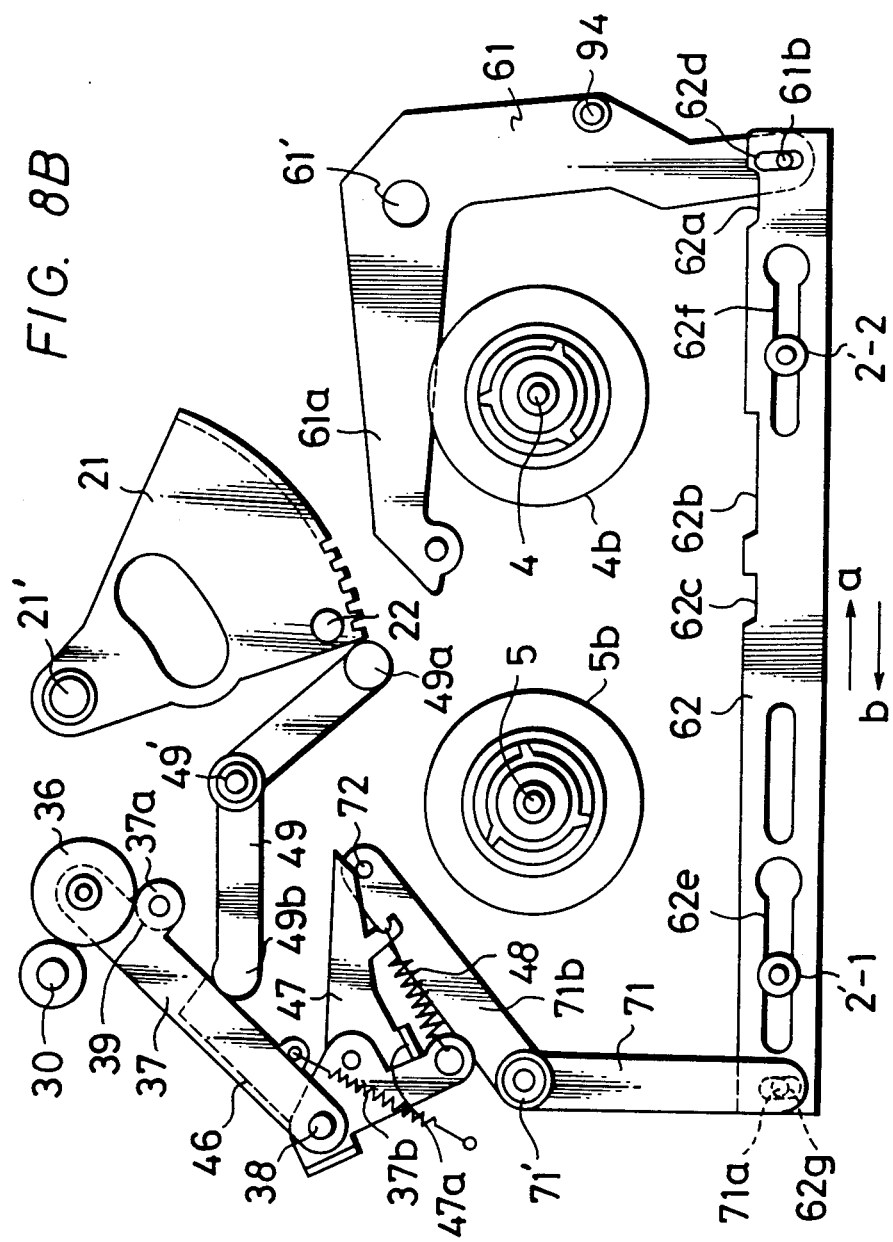
Figure 8C:
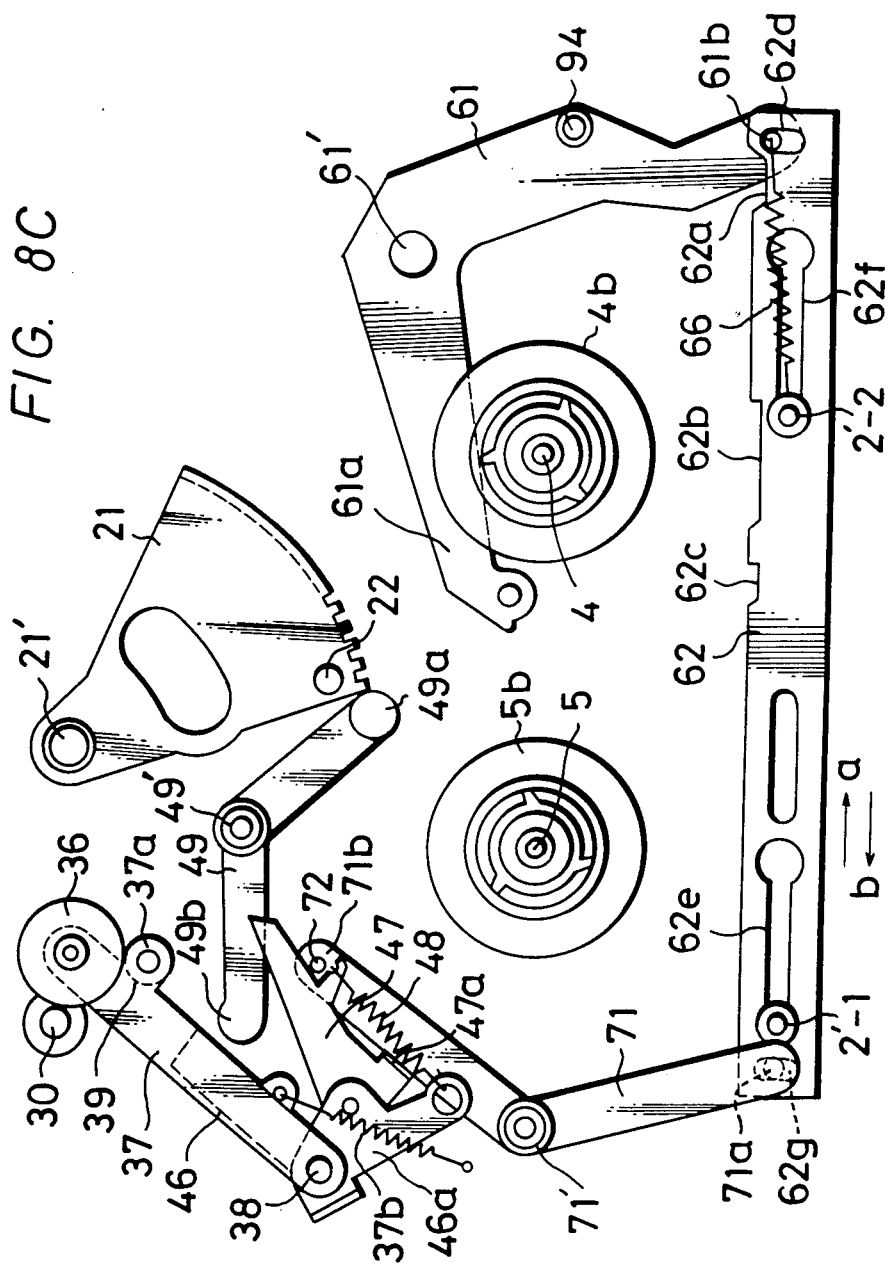

Referring to FIG. 8A, into an elongated opening 62g formed through the other end of the brake slider 62, there is engaged a pin 71a formed on one end of a lever 71 of V-shape which is rotatably supported at its central portion on the sub-base plate 2' by a shaft 71'. This lever 71 has a pin 72 protruding from its other end 71b. When the pinch roller arm 37 rotates to the set up state, or the rotation arm 46 is rotated through the lever 49 in accordance with the rotation of the sector shape gear 21, the engaging lever 47 is also rotated through contact of the engaging member 47a with the rotation arm 46 so that the pin 72 opposes the tip end of the lever 47. When the brake slider 62 moves in the direction shown by the arrow a, or carries out the stop-mode releasing operation so as to rotate the lever 71, this pin 72 contacts with the rear edge of the tip end of the engaging lever 47 (FIG. 8B). When the lever 71 is rotated further, the pin 72 pushes the engaging lever 47 so that the engaging member 47a leaves the rotation arm 46 but the rotation arm 46 is pulled by the spring 48 to rotate the pinch roller arm 37 more so that the pinch roller 36 is urged against the capstan 30. That is, the normal tape speed mode is presented (FIG. 8C).

Figure 9B:
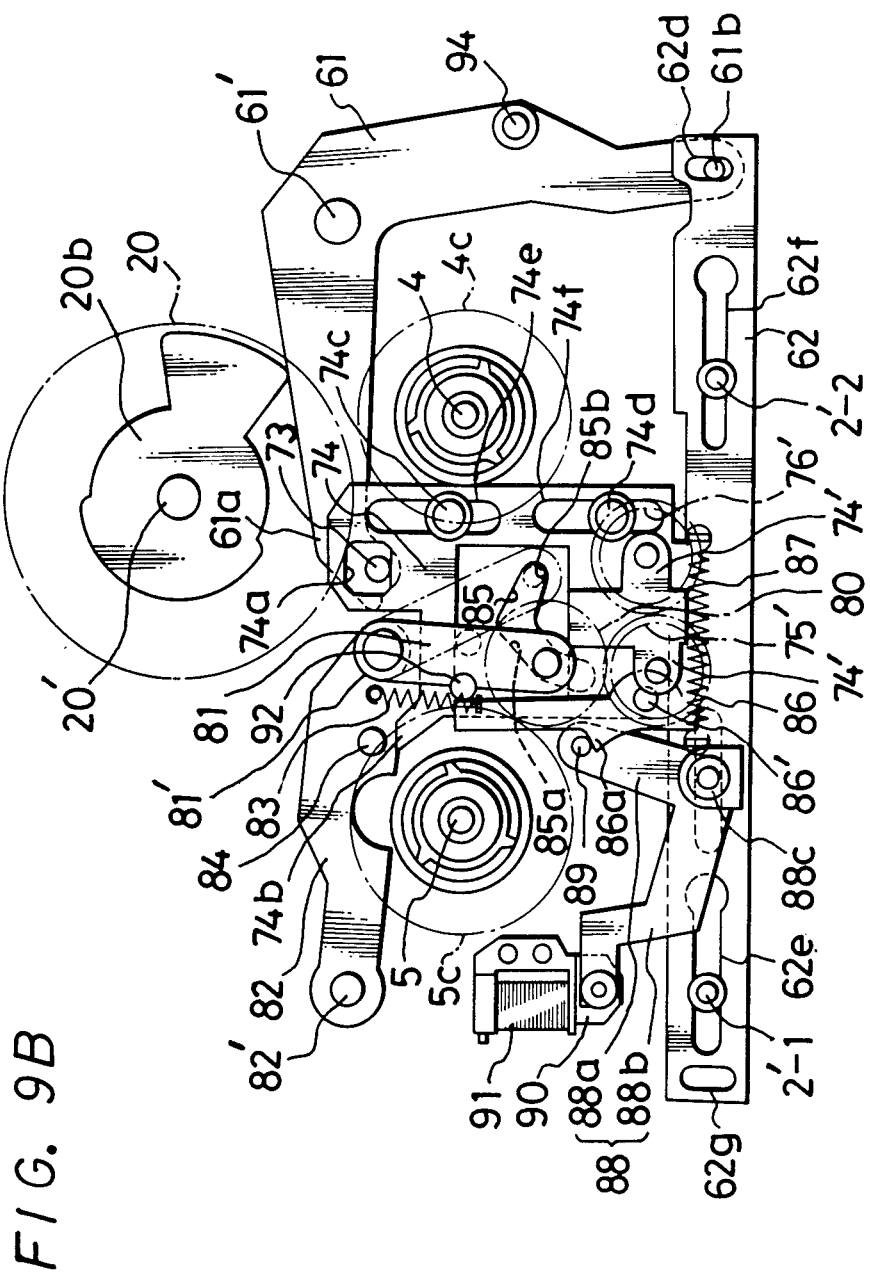
Figure 9C:
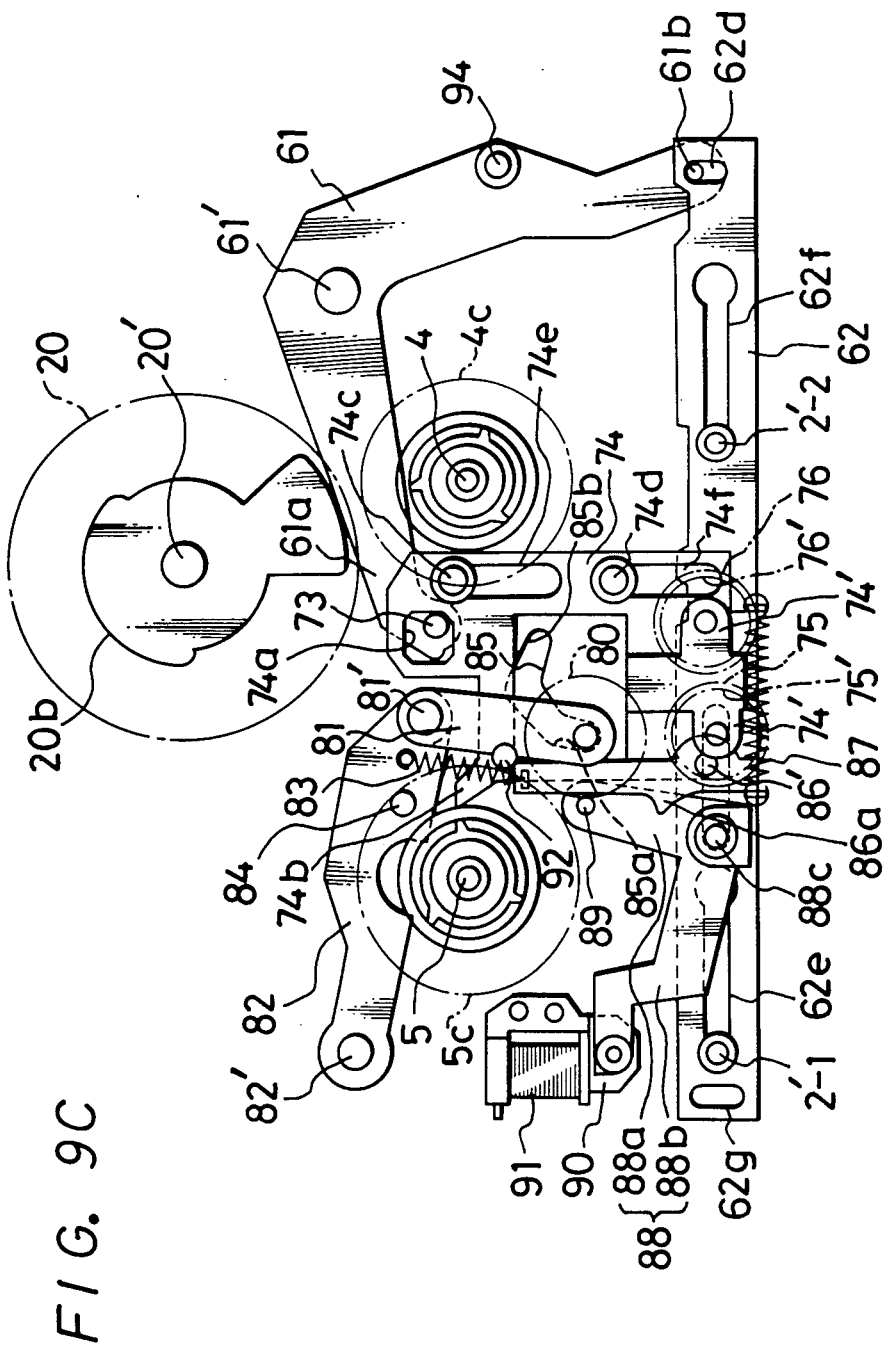

A fast foward/rewind mechanism of the invention will be described with reference to FIGS. 9A to 9C.

Referring to FIG. 9A, the mode selecting lever 61 is shown to have a pin 73 planted at its end 61a and this pin 73 is engaged in a window opening 74a of an operating plate 74 which is mounted for sliding in the back and forth direction by engaging pins 74c, 74d planted on the sub-base plate 2' and engaging in elongated openings 74e, 74f formed through the plate 74. On this plate 74, gears 75 and 76 are rotatably supported to be engaged with each other through a support plate 74'. The gear 75 has a belt 78 stretched between it and a gear 77 (refer to FIG. 4) rotatably supported on the sub-base plate 2' so that the rotation force from the gear 77 is transmitted to the gear 75. As a result, the other gear 76 rotates in the reverse direction at the same time. The gear 77 is rotatably coupled with a gear 79 (FIG. 3) which is suitably rotated from the motor 44, so that the gear 77 receives the drive force of the motor 44.

An arm 81 rotatably supports thereon a gear 80 which changeably engages with both a small diameter gear 75' of the gear 75 and the fast forward gear portion 5c of the take-up reel table 5 (FIG. 9B) or with both a small diameter gear 76' of the other gear 76 and the rewind gear portion 4c of the supply reel table 4. This arm 81 is pivotally coupled at 81' to the tip end of a lever 82 which is pivoted by a pin 82' to the sub-base plate 2' so as to be angularly displaceable in the back and forth direction with a predetermined load by using a compressed coil spring and the like. A spring 83 couples the lever 82 to the operating plate 74 and a protrusion 74b formed on the front edge of the plate 74 contacts with a pin 84 protruding from the lever 82. The free end of the arm 81 at which gear 80 is mounted engages with a guide groove 85 of substantially an L-shape formed through the sub-base plate 2' and swings right and left along the guide groove 85 when the plate 74 moves backward so that the gear 80 moves either between the small diameter gear 75' and the gear portion 5c of the take-up reel table 5 or between the other small diameter gear 76' and the gear portion 4c of the take-up reel table 4 and engages either of them so as to transmit the rotation force to either the reel table 4 or 5. Further, when the plate 74 moves rearwrd while the mode lever 61 is in its stop mode, the protrusion 74b contacts with the pin 84 of the lever 82 to angularly displace the lever 82 rearward so that the free end of the arm 81 is in the summit of the guide groove 85, which causes the gear 80 to be free from the gear portions 4c and 5c of both reel tables 4 and 5 as shown in FIG. 9A (stop mode). An engaging or coupling member 86 is pivotally mounted at one side portion of the plate 74 by a shaft 86' to be angularly displaceable in the lateral direction. This engaging member 86 is biased by a spring 87 so as to engage against a pin 89 on a stopper lever 88 which is biased to rotate by a spring 88' (FIG. 1) stretched between the guide pin 2'-1 and the stopper lever 88. When the plate 74 is moved forwardly, that is, toward brake slider 62, an engaging protrusion 86a of the member 86 engages with the pin 89 planted on one half portion 88a of the stopper lever 88 that is pivotably supported to the sub-base plate 2' at its central portion by a shaft 88c, whereby the plate 74 is held in its forward position (see FIG. 9B). More specifically, the stopper lever 88 has member 90 attached to an end of the other half 88b thereof and this member 90 opposes a plunger or solenoid 91 fixed to the sub-base plate 2'. When the plunger 91 is turned on, the plunger 91 attracts the member 90 to fix the stopper lever 88 in the position shown on FIG. 9B so that the point pin 89 engages in back of the engaging protrusion 86a of the engaging member 86 and the plate 74 is held in the moved state in the forward direction. When establishing the fast-forward mode, the plunger 91 is not turned on at the beginning so that the stopper lever 88 is free to rotate at the mode selecting lever 61 rotates, and the forward movement of the plate 74 can occur without tilting of the engaging member 86. After the engaging protrusion 86a of the engaging member 86 moves past the point pin 89 of the stopper lever 88, the plunger 91 is turned on and the stopper lever 88 is fixed with the engaging protrusion 86a of the engaging member 86 engaging in back of the pin 89 for holding the plate 74 in the forward position. As the plate 74 moves in the forward direction, the lever 82 is drawn forwardly by spring 83 and the arm 81 pivotally connected to lever 82 with a predetermined load is moved forward and is angularly biased about pin 81' in the clockwise direction relative to lever 82. Thus, the arm 81 is moved along one side 85a of the inverted V-shape groove 85, or it is swung in the direction to the take-up reel table 5 (the state shown by a solid line in FIG. 9B) whereby the gear 80 engages with the gear portion 5c of the take-up reel table 5 and the small diameter gear 75' to thereby transmit the drive force of the drive motor 44 to the take-up reel table 5. In this case, by the rotation of the mode lever 61, the brake slider 62 moves slidably to release the brakes 63, 64 and 65 for the reel tables 4 and 5 so that the tape is permitted to run in the fast forward (FF) mode, etc.

If, in this state, the plunger 91 is turned off, the stopper lever 88 becomes able to rotate freely to thereby release the engagement of pin 89 with member 86 on the plate 74 so that the latter is returned forwardly by spring 83. Accordingly, the gear 80 disengages from the gear portion 5c of the take-up reel table 5 so that the reel table 5 is changed from the tape transport mode to the stop mode. In this case, since the mode lever 61 is returned to its original condition, the both reel tables 4 and 5 are braked and thus the apparatus as a whole is placed in the stop mode.

On the other hand, in establishing the rewind (REW) mode, the plunger 91 is turned on in the beginning and the same operation as has been described for the fast-forward mode is carried out. In this case, since the plunger 91 is turned on from the beginning, the stopper lever 88 is fixed. Therefore, when the plate 74 is slidably moved in the forward direction, the engaging protrusion 86a of the engaging member 86 contacts with the point pin 89 of the stopper lever 88 so that the engaging member 86 is angularly displaced toward the right against the spring force of the spring 87 and then contacts with a pin 92 protruding from a side portion of the arm 81. Thus, the engaging member 86 pushes the arm 81 in the lateral direction toward the supply reel table 4 to thereby move the arm 81 along the other side groove portion 85b of the guide groove 85 (shown by a two-dot chain line in FIG. 9B) whereby gear 80 engages with the other small diameter gear 76' and the gear portion 4c of the supply reel table 4 so as to transmit the drive force of the drive motor 44 through the gear 80, the small diameter gears 75' and 76' to the supply reel table 4, thus rotating the supply reel table 4 in the rewind mode. Also in this case, the plate 74 is locked in its foremost position by engaging the engaging protrusion 86a of the engaging member 86 with the point pin 89 of the stopper lever 88 which is in the fixed state so long as plunger 91 is energized or turned on and hence the supply reel table 4 is kept rotating in the rewind mode.

In the normal tape speed transport mode, the mode selecting lever 61 is rotated largely by the cam portion 20b₃ of the cam gear 20 to thereby move the plate 74 to its foremost position. In this case, since the arm 81 engages with the forward end portion of the guide groove 85 and does not follow the full forward movement of the plate 74, the gear 80 pivoted at the tip end portion of the arm 81 disengages from the gears 4c, 5c of the reel tables 4, 5 and from the gears 75, 76 whereby no drive force of the drive motor 44 is transmitted to the reel tables 4 and 5, and the gear 80 never acts as a load resisting the normal tape speed rotation of the reel tables 4 and 5.

Further, as shown in FIG. 4, a lever on 93 is pivotably supported at a pin 93' on the sub-base plate 2' at the side of the mode lever 61 and this lever arm 93 is always made to engage with a pin 94 protruding from the mode selecting lever 61 by the biasing force of a spring 95. The lever on 93 has a pin 96 extending from its tip end. This pin 96 protrudes through an elongated guide opening 96 (FIG. 3) formed through the base plate 2 to the surface side thereof and opposes the outer edge of the tension arm 31 as shown in FIG. 2. When the mode lever 61 rotates in the couterclockwise direction from its stop position (FIG. 9A), lever arm 93 is pushed laterally by pin 94 and the pin 96 moves to the outer end of the elongated guide opening 97 away from tension arm 31. However, when the mode selecting lever 61 returns to its original or stop position, the lever arm 93 is returned to the original position by the biasing force of the spring 95. In that case, the pin 96 pushes the outer edge of the tension arm 31 to rotate the tension arm 31 whereby the tip end portion of the tension arm 31 disengages from the tape guide post mount 11. In other words, since the tension arm 31 is rotated by the pin 96, the tip end portion of the tension arm 31 is positioned inwardly and forwardly of the tape guide post mount 11. Accordingly, as the tape guide post mount 11 is moved in the returning direction during unloading, the tension arm 31 is rotated and returned to the original condition against the spring force of the spring 32.

Although a single preferred embodiment of the invention is described above, it will be apparent that many modifications and variations could be therein by one skilled in the art without departing from the spirit or scope of the novel concepts of the invention, so that the scope of the invention should be determined by the appended claims only.

I claim as my invention:

1. An apparatus for recording and/or reproducing signals on a magnetic tape wound on supply and take-up reels in a cassette, comprising:

laterally spaced apart, rotary supply and take-up reel tables for rotatably supporting said supply and take-up reels, respectively, within the cassette when the latter is operatively positioned;

a magnetic head assembly spaced rearwardly from said rotary reel tables and being operative to magnetically record or reproduce signals on the tape when the latter is disposed in a predetermined path leading out of the operatively positioned cassette;

tape guide means movable between an inoperative position in which said guide means are engageable with the tape within the operatively positioned cassette and an operative position in which said guide means withdraw the tape from the cassette and dispose the withdrawn tape in said predetermined path;

a single control motor;

a cam gear rotatably couled with said control motor to be driven by the latter and having first and second cam portions, said cam gear being positioned generally between said reel tables and said head assembly;

loading and unloading means engaged with said first cam portion and moving said tape guide means between said inoperative and operative positions in response to predetermined turning of said cam gear by said control motor;

a mode-selecting lever having substantially angled first and second arms and being pivotally supported intermediate said arms with said first arm extending laterally in back of one of said reel tables and engaging said second cam portion and said second arm extending forwardly at the outside of said one reel table;

a brake-control slide member extending laterally in front of said reel tables and being connected, at one end, to said second arm of the mode-selecting lever so that said slide member is longitudinally displaced in a lateral direction in response to pivoting of said mode selecting lever by said second portion of the cam gear;

brake members for the supply and take-up reel tables, respectively, and being actuable by the longitudinal displacement of said brake-control slide for selectively engaging said disengaging the respective reel tables;

a rotatably driven capstan;

a pinch roller;

support means for said pinch roller pivotally mounted at the outside of the other of said reel tables for movement of said pinch roller between an inoperative position remote from said capstan and an operative position in which said pinch roller is pressed against said capstan with the tape in said path therebetween; and actuating means for said pinch roller connected with said brake-control slide member at the other end of the latter and being operative on said support means for the pinch roller to urge the latter to said operative position in response to predetermined displacement of said brake-control slide member.

2. An apparatus according to claim 1; in which said support means for the pinch roller is biased to said inoperative position of the pinch roller; and further comprising set-up means for said pinch roller operated from said first cam portion for moving said pinch roller from said inoperative position to a set-up position near said operative position of the pinch roller simultaneously with the movement of said tape guide means to said operative position of the latter.

3. An apparatus according to claim 2; in which said support means for the pinch roller includes a pivoted support arm on which said pinch roller is rotatably mounted, and an engaging arm pivoted relative to said support arm and being biased by a spring to a predetermined angular position relative to said support arm; and in which said actuating means includes an actuating lever pivoted intermediate its ends and connected at one of said ends to said other end of the brake-control slide member, the other end of said actuating lever being engageable with said engaging arm in said set-up position of the pinch roller so that said pinch roller is thereafter urged to said operative position through said spring between the support and engaging arms.

4. An apparatus according to claim 1; further comprising a drive motor for rotating said capstan; a high-speed drive mechanism coupled with said drive motor for selectiively driving said supply and take-up reel tables; and control means for said high-speed drive mechanism connected with said first arm of said mode-selecting lever so as to be also operable by said second cam portion of the cam gear.

5. An apparatus according to claim 4; in which said cam gear has rotary positions corresponding to at least a stop made, a tape loading or unloading mode, a high speed fast-forward or rewind mode and a normal tape speed forward mode, respectively;

said brake members include first and second main brake members selectively engageable with said supply and take-up reel tables, respectively, for strongly braking the respective reel tables, and a soft brake member engageable with said supply reel table for applying a soft, yieldable braking force to the latter;

said brake-control slide member has a longitudinal edge engageable by said first and second main brake members and said soft brake member for disengaging said brake members from the respective reel tables, and said longitudinal edge of the brake-control slide member has recesses therein which selectively receive said main brake members and said soft brake member, respectively, for permitting engagement of the respective brake members with said reel tables; and said recesses are positioned and dimensioned along said brake-control slide member so that, when said cam gear is in said rotary position corresponding to said stop mode, all of said recesses receive the respective brake members for enaging all of said brake members with the respective reel tables; when said cam gear is in said rotary position corresponding to said tape loading or unloading mode, said second main brake member is moved out of the respective recess and onto said longitudinal edge of the brake-control slide member so as to free said take-up reel table for rotation while said first and soft brake members continue to engage the respective recesses for strongly braking rotation of said supply reel table; and, when said cam gear is in said rotary position corresponding to said high speed fast-forward or rewind mode, all of said brake members are removed from the respective recesses and engage said longitudinal edge for freeing both of said reel tables for high speed rotation.

6. An apparatus according to claim 5; in which the one of said recesses associated with said first main brake member is longer than the one of said recesses associated with said soft brake member so that, in changing over from said high speed mode to said stop mode, said soft brake member is engaged with said supply reel table before said first main brake member is engaged therewith for avoiding excessive loads on the tape.

7. An apparatus according to claim 4; in which said high-speed drive mechanism includes a gear support plate mounted for fore-and-aft movement between said supply and take-up reel tables, first and second drive gears rotatably mounted side-by-side on said gear support plate and meshing with each other for rotation in opposite directions, first and second driven gears on said supply and take-up reel tables, means for rotatably driving one of said first and second drive gears from said drive motor, a transfer gear, a gear support arm pivotally mounted between said supply and take-up reel tables and rotatably supporting said transfer gear for lateral shifting between a first position in which said transfer gear engages between said first drive and driven gears for effecting high-speed driving of one of said supply and take-up reel tables, and a second position in which said transfer gear engages between said second drive and driven gears for effecting high-speed driving of the other of said reel tables, means connecting said gear support plate with said first arm of the mode-selecting lever for effecting said fore-and-aft movement in response to pivotal movements of said mode-selecting lever by said second cam portion, and means for selectively shifting said transfer gear to said first and second positions upon said fore-and-aft movement thereof.

8. An apparatus according to claim 7; in which said cam gear has rotary positions corresponding to at least a stop mode, a high speed fast-forward or rewind mode and a normal tape speed forward mode, respectively;

said gear support arm pivotally extends from a support lever which is spring urged to move with said gear support plate; and said means for selectively shifting said transfer gear includes a guide groove having first and second portions diverging forwardly from an apex and engaged by the axis of said transfer gear for shifting the latter in one lateral direction or the other during movement along said first portion or second portion, respectively, of the guide groove, and electromagnetically energized means for selectively determining along which of said first and second guide groove portions said transfer gear is moved upon forward displacement of said gear support plate.

9. Apparatus according to claim 8; in which said means for selectively determining along which of the first and second guide groove portions said transfer gear is moved includes an engaging lever pivoted on said gear support plate and biased to extend parallel to the direction of the movements of said gear support plate to permit said gear support arm to normally dispose said transfer gear to follow said first guide groove portion, a nose-like protrusion on said engaging lever, a pivoted latch lever mounted alongside said gear support plate, and a solenoid energized for locking said latch lever in an operative position interposed in the path of travel of said nose-like protrusion on the engaging lever with said gear support plate, said solenoid being energized after said transfer gear attains said first position so that said latch lever is locked in back of said nose-like protrusion for maintaining the high-speed fast-forward mode until said solenoid is deenergized, and said solenoid being energized when changing-over to said high-speed rewind mode so that, as said protrusion moves past the latch lever locked in its operative position, said engaging lever is deflected laterally to similarly deflect said gear support arm for causing said transfer gear to move along said second guide groove portion to said second position of the transfer gear, whereupon said high-speed rewind mode is maintained for as long as said solenoid is energized.

* * * * *